(12) United States Patent
Ma et al.

(10) Patent No.: US 9,934,416 B2
(45) Date of Patent: Apr. 3, 2018

(54) INDUSTRIAL DESIGN FOR CONSUMER DEVICE BASED SCANNING AND MOBILITY

(75) Inventors: Qiurong Ma, Shanghai (CN); Hongzhi Ren, Shanghai (CN); Liuxin Huang, Shanghai (CN); Jun Yin, Shanghai (CN); Wenjie Gu, Shanghai (CN); Yun Li, Shanghai (CN); Xiaoxun Zhu, Suzhou (CN); Huatao Liu, Shanghai (CN)

(73) Assignee: Honeywell International, Inc., Morris Plains, NJ (US)

( * ) Notice: Subject to any disclaimer, the term of this patent is extended or adjusted under 35 U.S.C. 154(b) by 177 days.

(21) Appl. No.: 14/370,267

(22) PCT Filed: Jan. 17, 2012

(86) PCT No.: PCT/CN2012/070449
§ 371 (c)(1),
(2), (4) Date: Oct. 15, 2014

(87) PCT Pub. No.: WO2013/106991
PCT Pub. Date: Jul. 25, 2013

(65) Prior Publication Data
US 2015/0028104 A1      Jan. 29, 2015

(51) Int. Cl.
*G06K 7/10* (2006.01)
*H04M 1/21* (2006.01)
(Continued)

(52) U.S. Cl.
CPC ....... *G06K 7/1443* (2013.01); *G06K 7/10722* (2013.01); *G06K 7/10881* (2013.01);
(Continued)

(58) Field of Classification Search
CPC .............. H04M 1/21; H04M 1/72522; H04M 2250/22; H04M 17/304; Y10T 29/49117;
(Continued)

(56) References Cited

U.S. PATENT DOCUMENTS 4,805,175 A * 2/1989 Knowles .............. G06K 7/1098
                                                235/462.21
4,939,356 A * 7/1990 Rando ................ G06K 7/10871
                                                235/462.2
(Continued)

FOREIGN PATENT DOCUMENTS

CN            1599488 A       3/2005
CN          102289650 A      12/2011

OTHER PUBLICATIONS

International Search Report in related International Application No. PCT/CN2012/07449, dated Nov. 15, 2012, 3 pages.

*Primary Examiner* — Daniel Walsh
(74) *Attorney, Agent, or Firm* — Additon, Higgins & Pendleton, P.A.

(57) ABSTRACT

A data entry and scanning apparatus that includes a commercially available mobile device wherein said commercially available mobile device with a touch screen display, a processor, and a wireless communications network access point, a scanning device, an interface, and a power source that external to the commercially available mobile device and connected to the interface, and a casing that does not cover the touch screen display.

20 Claims, 13 Drawing Sheets

(51) Int. Cl.
*H04M 1/725* (2006.01)
*G06K 7/14* (2006.01)

(52) U.S. Cl.
CPC ......... *H04M 1/21* (2013.01); *H04M 1/72522* (2013.01); *H04M 2250/22* (2013.01); *Y10T 29/49117* (2015.01)

(58) Field of Classification Search
CPC .. G06K 7/10722; G06K 7/1443; G06K 7/089; G06K 7/10386; G06K 7/10881; G06K 7/1098; G06K 2007/10524
See application file for complete search history.

(56) References Cited

U.S. PATENT DOCUMENTS

| | | | | |
|---|---|---|---|---|
| 4,983,818 | A * | 1/1991 | Knowles | G06K 7/10881 235/462.33 |
| 5,155,346 | A * | 10/1992 | Doing | G06K 7/10871 235/462.14 |
| 5,258,604 | A * | 11/1993 | Behrens | G06K 7/10881 235/462.15 |
| 5,480,033 | A * | 1/1996 | Kalisiak | B07C 3/02 209/584 |
| 5,554,822 | A * | 9/1996 | Gilpin | G06K 13/08 174/542 |
| 5,576,530 | A * | 11/1996 | Hagerty | G06K 7/10752 235/462.47 |
| 5,702,059 | A * | 12/1997 | Chu | G01J 3/51 235/454 |
| 5,796,088 | A * | 8/1998 | Wall | G06K 7/10881 235/462.15 |
| 5,940,771 | A * | 8/1999 | Gollnick | G08C 17/02 370/311 |
| 5,992,752 | A * | 11/1999 | Wilz, Sr. | G06K 7/10851 235/462.01 |
| 6,149,063 | A * | 11/2000 | Reynolds | G06K 17/0022 235/472.01 |
| 6,177,950 | B1 * | 1/2001 | Robb | H04M 1/72522 348/14.01 |
| 6,179,206 | B1 * | 1/2001 | Matsumori | G06Q 20/343 235/375 |
| 6,687,346 | B1 | 2/2004 | Swartz et al. | |
| 6,851,611 | B1 * | 2/2005 | Shaw-Sinclair | 235/472.01 |
| 7,054,148 | B2 * | 5/2006 | Chen | G06F 1/1632 345/173 |
| 7,089,291 | B1 * | 8/2006 | Philyaw | G06F 17/30722 379/93.12 |
| 7,248,160 | B2 * | 7/2007 | Mangan et al. | 340/539.13 |
| 7,364,077 | B2 * | 4/2008 | Wolf, II | G06F 1/1632 235/454 |
| 7,584,885 | B1 * | 9/2009 | Douglass | G06Q 20/1085 235/375 |
| 8,016,194 | B2 * | 9/2011 | Hause | G06K 7/0004 235/384 |
| 8,282,005 | B2 | 10/2012 | Cudzillo | |
| 8,346,979 | B1 * | 1/2013 | Lee | G06F 1/1632 235/449 |
| 8,483,758 | B2 * | 7/2013 | Huang | 455/557 |
| 8,733,657 | B2 * | 5/2014 | Harris | G06K 19/06028 235/375 |
| 8,814,049 | B2 * | 8/2014 | Lee | G06K 7/10881 235/462.3 |
| 8,832,323 | B2 * | 9/2014 | Lee | 710/5 |
| 8,856,033 | B2 * | 10/2014 | Hicks | G07G 1/0081 235/385 |
| 8,971,049 | B1 * | 3/2015 | Vier | H04M 1/0254 29/830 |
| 9,053,380 | B2 * | 6/2015 | Xian | G06K 7/10881 |
| 9,122,941 | B2 * | 9/2015 | Hoobler | H04B 1/3888 |
| 2001/0034222 | A1 * | 10/2001 | Roustaei et al. | 455/403 |
| 2001/0035459 | A1 * | 11/2001 | Komai | 235/462.25 |
| 2002/0027164 | A1 * | 3/2002 | Mault et al. | 235/462.46 |
| 2002/0111921 | A1 * | 8/2002 | Aupperle | G06Q 20/20 705/75 |
| 2002/0194075 | A1 * | 12/2002 | O'Hagan | G06Q 20/201 705/21 |
| 2003/0006998 | A1 * | 1/2003 | Kumar | G06F 1/1626 715/700 |
| 2003/0101159 | A1 * | 5/2003 | Liou et al. | 707/1 |
| 2003/0101233 | A1 * | 5/2003 | Liou et al. | 709/218 |
| 2003/0209604 | A1 * | 11/2003 | Harrison, Jr. | 235/462.44 |
| 2003/0222150 | A1 * | 12/2003 | Sato | G06F 1/1626 235/472.02 |
| 2003/0236104 | A1 * | 12/2003 | Lin | 455/556.1 |
| 2005/0026643 | A1 * | 2/2005 | White | B23Q 1/0009 455/550.1 |
| 2005/0230472 | A1 * | 10/2005 | Chang | G06Q 20/343 235/383 |
| 2005/0247787 | A1 * | 11/2005 | Von Mueller et al. | 235/449 |
| 2006/0046793 | A1 * | 3/2006 | Hamilton et al. | 455/575.1 |
| 2006/0105722 | A1 * | 5/2006 | Kumar | G06F 1/1632 455/90.3 |
| 2006/0113389 | A1 * | 6/2006 | Barkan | G06K 7/10732 235/462.21 |
| 2006/0266840 | A1 * | 11/2006 | Vinogradov | G06K 7/10 235/462.45 |
| 2006/0284987 | A1 * | 12/2006 | Wolf, II | G06F 1/1632 348/220.1 |
| 2007/0145138 | A1 * | 6/2007 | Snyder et al. | 235/462.01 |
| 2007/0297149 | A1 * | 12/2007 | Richardson et al. | 361/731 |
| 2008/0017722 | A1 * | 1/2008 | Snyder et al. | 235/494 |
| 2008/0018455 | A1 * | 1/2008 | Kulakowski | G06F 1/1632 340/539.11 |
| 2008/0073433 | A1 * | 3/2008 | Nam | 235/439 |
| 2008/0101026 | A1 * | 5/2008 | Ali | 361/708 |
| 2008/0105743 | A1 * | 5/2008 | Mills | G06K 7/10 235/441 |
| 2008/0142603 | A1 * | 6/2008 | Mynhardt | 235/462.43 |
| 2008/0294766 | A1 * | 11/2008 | Wang et al. | 709/223 |
| 2009/0043205 | A1 * | 2/2009 | Pelissier | A61B 8/00 600/446 |
| 2009/0066294 | A1 * | 3/2009 | Sabram | 320/137 |
| 2009/0224039 | A1 * | 9/2009 | Hause | G06K 7/0004 235/385 |
| 2009/0312053 | A1 * | 12/2009 | An | G06K 7/10326 455/556.2 |
| 2010/0133339 | A1 * | 6/2010 | Gibson | G06Q 10/02 235/382 |
| 2011/0198395 | A1 * | 8/2011 | Chen | G06K 7/084 235/380 |
| 2011/0309151 | A1 | 12/2011 | Cudzillo | |
| 2012/0061462 | A1 * | 3/2012 | Shadwell et al. | 235/375 |
| 2012/0286048 | A1 * | 11/2012 | Liu | G06K 7/01 235/462.48 |
| 2013/0013813 | A1 * | 1/2013 | Lee | 710/5 |
| 2013/0109316 | A1 * | 5/2013 | Lee | H04M 1/725 455/41.2 |
| 2013/0270336 | A1 * | 10/2013 | Bonomo et al. | 235/375 |
| 2013/0341399 | A1 * | 12/2013 | Xian | G06K 7/1098 235/449 |
| 2014/0061312 | A1 * | 3/2014 | Tien | G06K 7/10881 235/462.33 |
| 2014/0183260 | A1 * | 7/2014 | Sancak | 235/383 |
| 2014/0249944 | A1 * | 9/2014 | Hicks et al. | 705/17 |
| 2014/0347000 | A1 * | 11/2014 | Hamann | G06F 1/189 320/103 |
| 2015/0041544 | A1 * | 2/2015 | Chen | G06K 7/1098 235/462.1 |
| 2015/0115037 | A1 * | 4/2015 | Hoobler | H04B 1/3888 235/462.45 |
| 2015/0235068 | A1 * | 8/2015 | Gillet | G06K 7/10801 235/462.11 |
| 2015/0371072 | A1 * | 12/2015 | Liou | G06K 7/1098 235/375 |

* cited by examiner

600

800

1200

FIG 13
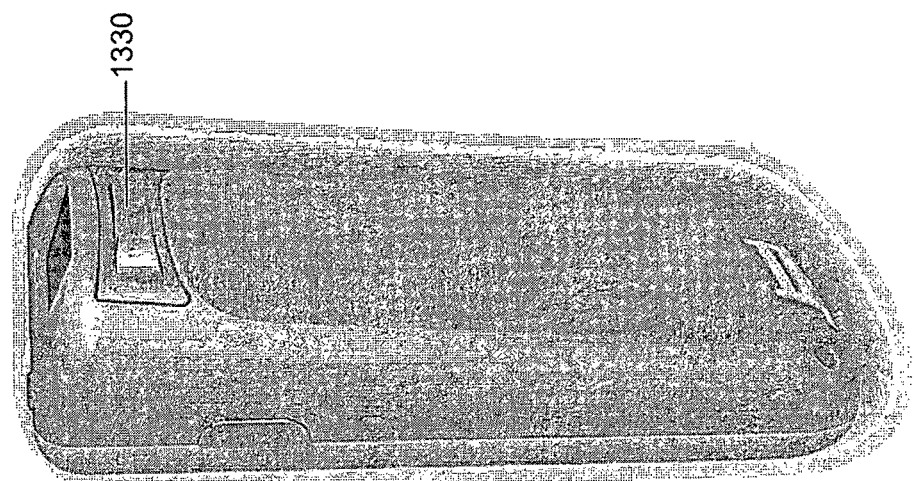
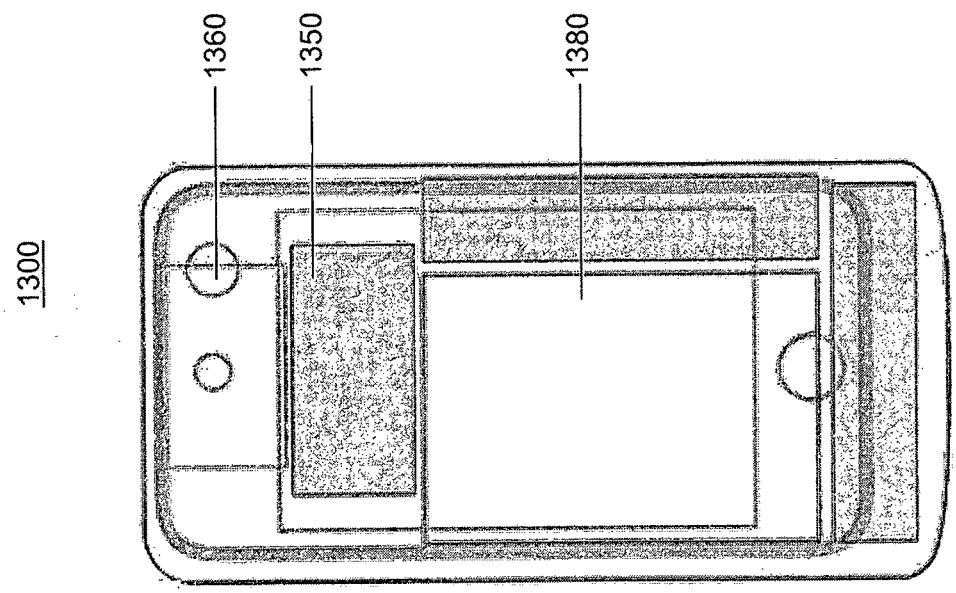

INDUSTRIAL DESIGN FOR CONSUMER DEVICE BASED SCANNING AND MOBILITY

FIELD OF INVENTION

The present invention provides a networking-enabled portable optical scanner with a touch screen and a method of utilizing the same in a clinical setting.

BACKGROUND OF INVENTION

Bar codes are graphical representations of data, images of decodable indicia, the most common of which are referred to as one dimensional (1D) and two dimensional (2D) bar codes. 1D bar codes are images that represents data by varying the widths and spacings of parallel lines. 2D bar codes are also images that represent data, but in addition to the parallel lines, or bars, a 2D bar code may contain rectangles, dots, hexagons and other geometric patterns in two dimensions. A common example of a 2D bar code is a Quick Response (QR) code. QR codes consist of black modules arranged in a square pattern on a white background. The data encoded in bar codes are interpreted by optical scanners and/or software.

Bar codes originally were scanned by special optical scanners called bar code readers; later, scanners and interpretive software became available on devices, including desktop printers and smart phones. Today, devices considered bar code readers include, but are not limited to: pen-type readers, laser scanners, CCD readers, camera-based readers, omni-directional bar code scanners, and cell phone cameras.

Some of the leading manufacturers of mobile devices offer bar code scanning software that can be installed on their respective devices. The goal of this software is to allow consumers to use their mobile devices to scan bar codes that they encounter, including, but not limited to, those on products in stores or on advertisements for products and/or services located in media such as magazines and posted in public places, such as bus stops.

Rather than integrating a laser scanner into a mobile device, mobile device manufacturers rely on the camera in the device to capture the image before it is processed, i.e., decoded by the software installed on the phone or remotely accessible to the phone via a network connection.

The capability of a mobile device to decode a bar code is impeded by the speed of the process. In fact, it takes several seconds from data capture to decode out. The majority of the lag is because the camera takes too long to capture the image, slowing down the processing time in general.

In a hospital environment, bar code technology is used to label various objects, such as charts and medication, so that the data associated with these objects can be scanned quickly by nurses and other hospital personnel equipped with optical scanners. Optical scanners are preferable because of their superior speed.

Nurses and other hospital workers often need to enter data to accompany the scanned image data. For example, a nurse will scan a chart that will contain the identification information for a patient and will then, after examining the patient, enter information gleaned from this examination, such as the patient's temperature, vital signs, and symptoms.

To be useful in a hospital environment, a mobile scanning device should be easy to carry, light-weight, user-friendly, sanitary, and relatively inexpensive. Expensive devices are problematic because the job of nurses is very physical. Hospitals and clinical settings provide exposure to many substances that are not compatible with maintaining electronic devices. Also, a nurse's job includes lots of bending down and lifting. Exposing any mobile device to these types of external elements and rigors decreases its useable life due to wear and tear. Thus, a device that is replaced at short intervals cannot be prohibitively expensive.

Other than expense, two problems found in current devices, such as the MC50 and the MC55 by Moto, are that the designs are not ergonomic and not user-friendly. These devices feature an optical scanner and a keyboard. However, the screen is small and the keyboard is heavy. These features render the devices more difficult to carry and data entry more challenging. Specifically, Moto's MC55, which is still in production today, cannot be held easily by nurses while they are working due to its size and awkward shape.

The producers of mobile computers have produced computing solutions that are small, light, and user-friendly. These characteristics are all desirable for nurses and other hospital workers in a clinical setting. However, off-the-shelf mobile computers do not have the scanning capabilities required in a hospital or clinical setting. For example, Apple's iPod Touch 4 is lightweight and the touch screen provides a keyboard graphical user interface (GUI). Although bar code interpretation can be accomplished by software in combination with cameras integrated into mobile devices, such as the iPod Touch, using a camera and software to capture and interpret a bar code is much slower than using an optical scanner. Thus, although an iPod Touch is easily mobile and user-friendly, its scanning capabilities are slow and therefore are not suited for a hospital environment.

Other than the data entry capabilities and light weight, mobile computer systems are also useful in a hospital or clinical environment because they have wireless networking capabilities. Mobile devices can receive information and send it to a central repository or storage resource at the hospital. Additionally, these device can download records for update, make updates, and send the updates to the central repository. When dealing with medicating and treating patients, coordinating information between caregivers is an important part of a successful treatment regimen. Using devices that can communicate with each other and with additional network resources is advantageous to the workflow.

Connecting to resources via a network connection also enables individual devices to off-load onerous processing tasks and voluminous storage to other resources. These resources can be housed in the hospital facility or off-site. Resources may include those proprietary to the hospital's network and those external to this network, such as clouds, whose resources can be shared across different clients and networks. When a hand-held device can access a network, the capacity of the device itself becomes less important and the weight of the device and its components can be further reduced.

A need exists for a hand-held mobile scanning technology that combines the attributes of popular mobile devices, the ease of mobility and networking capabilities, with the advantages of optical scanning technology, its speed and accuracy.

SUMMARY OF INVENTION

An object of the present invention is to provide a hand-held mobile scanning technology that combines mobility and network connectivity with optical scanning.

Another object of the present invention is to provide a method of using a hand-held mobile scanning technology that combines mobility and network connectivity with optical scanning in a clinical environment, such as a hospital setting.

The advantages of integrating a network-enabled device into a mobile optical scanner include but are not limited to, the compatibility of the device with any existing technical infrastructure, and the networking possibilities both on and off-site. The advantages of using optical scanning in a mobile device instead of capturing an image with a camera include, but are not limited to, speed, accuracy and battery life.

An embodiment of the present invention is a Wi-Fi-enabled portable optical scanner with a touch screen. In an embodiment of the present invention, the components of an embodiment of the device include, but are not limited to, a casing, including a front and back cover. This casing houses a touch screen mobile device, such as an iPod Touch 4, a heat shield, a bar code scanning engine, a board with a bar code decoding engine, a power button, a scan button, a battery, an interface board, to interface between the scanning mechanism and the mobile touch screen device, and two belt rivets.

The back cover of the casing of an embodiment of the present invention has an ergonomically designed curved back, making the device easy for a mobile user to hold. The scanner integrated into an embodiment of the present invention is positioned to provide an optimal scanning angle (e.g., 15 degrees). The casing positions the scanner at this optimal angle.

An embodiment of the present invention is equipped with two options for initiating bar code scanning. The first option is a mechanical button integrated into the casing of the unit. The second option is to control the optical scanner via the graphical user interface (GUI). Both options can be used interchangeably by a nurse and/or other medical staffer utilizing this embodiment to scan bar codes that appear on patient records, identification bracelets, and medicines. The term bar code refers to any item containing decodable indicia, including but not limited to a 1D bar code, a 2D bar code and/or one or more optical character recognition (OCR) symbols.

In an embodiment of the present invention, the mobile touch screen device connects to an available network. Initializing the scan engine either through the GUI or using the scan button, the engine scans an image of decodable indicia, such as a bar code. The decodable indicia is located and decoded by the decoding board and sent to the mobile touch screen device, whose processor executes code that sends the decoded data to a resource external to this embodiment for further processing and/or storage. One such external resource, or collection of resources, that can be used in conjunction with this embodiment, is a cloud.

In an embodiment of the present invention, the software integrating the scanning engine with the mobile computing device and processing the data and sending it via a network connection, runs on the operating system of the mobile touch screen device, such as iOS, for ease of compatibility with existing technical infrastructures.

BRIEF DESCRIPTION OF DRAWINGS

FIG. 13 depicts an embodiment of the present invention.

DETAILED DESCRIPTION OF THE INVENTION

The present invention provides a networking-enabled portable optical scanner with a touch screen and a method of utilizing the same, in a clinical setting.

In a clinical setting, nurses and other hospital personnel carry personal mobile devices. They utilize these devices to scan bar codes appearing on medical records, medications, patient charts, and supplies. They also use these devices to input information into the medical records of patients. Thus, both scanning and data entry capabilities in a mobile device are desirable to a medical worker in a clinical setting.

The present invention combines a mobile touch screen device, such as an iPod Touch 4, with an optical scanner, in a environmentally compatible ergonomic casing. The resultant apparatus utilizes the mobile touch screen device's touch screen interface, wireless networking capabilities, existing operating system, existing hardware, and cloud-computing compatibility. The integration of the mobile touch screen device into a hand-held scanning apparatus renders this apparatus light-weight, programmable, and compatible with most if not all existing technical infrastructures. The resultant apparatus utilizes the scan engine, and the decoding board. The integration of the optical scanner renders the scanning operations of the apparatus fast and efficient.

The use of the optical scanner is significantly faster than using the scanning functionality in the mobile touch screen device. For example, in an iPod Touch, scanning images of decodable indicia, such as bar codes, is accomplished by taking a picture of the bar code with the camera integrated into this device and locating and decoding the decodable indicia with computer code, software, executing of the processor of the mobile touch screen device. The act of taking a picture of a bar code and ensuring that this pictures is suitable for decoding with the software is seconds slower than scanning the bar code with an optical scanner. These seconds are crucial in a fast-paced clinical setting.

Figure 1:
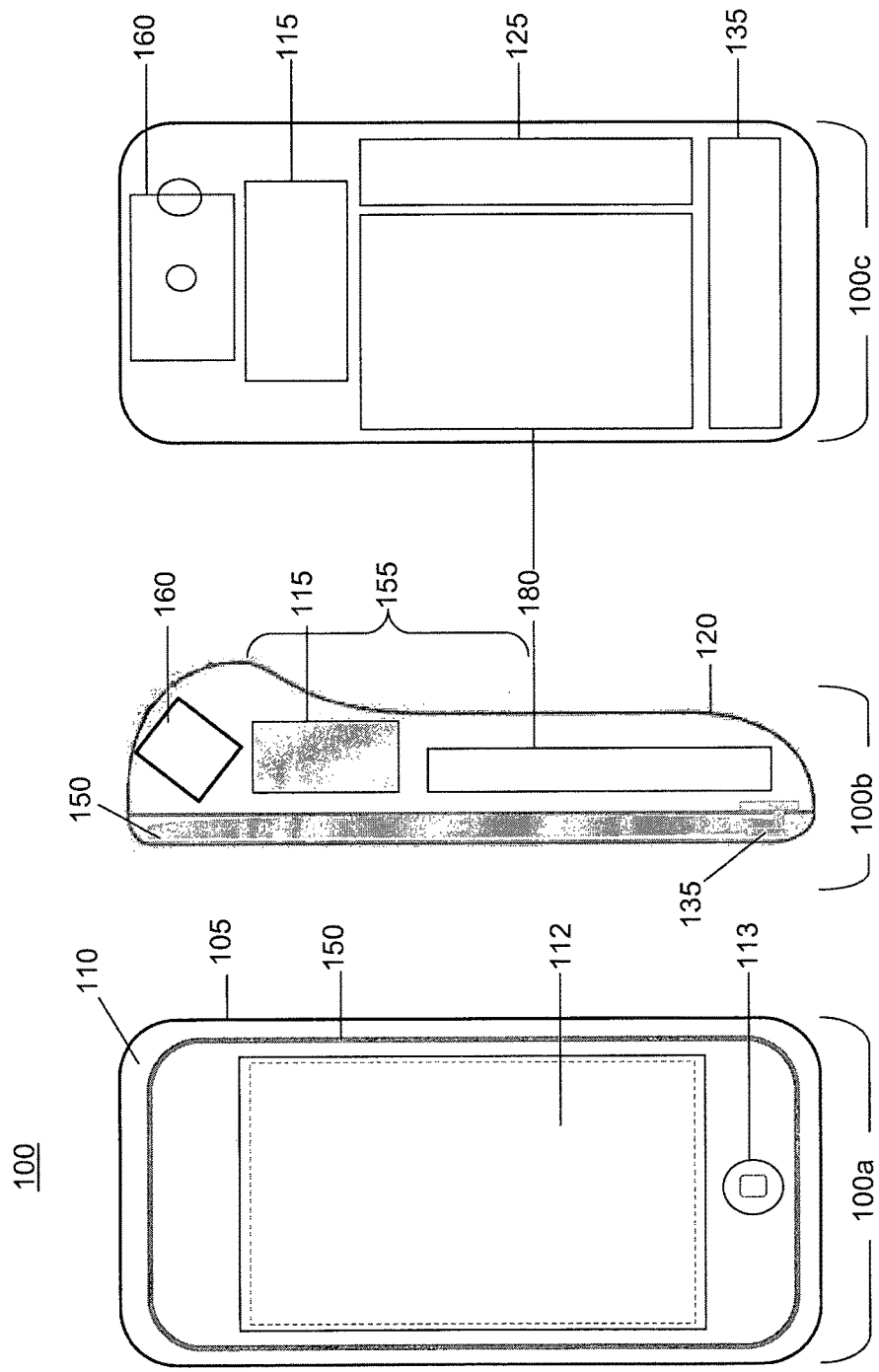
FIG. 1 depicts an embodiment of the present invention.

FIG. 1 depicts a front view 100a, a side view 100b, and a rear view 100c, of an embodiment of the present invention. The various components are enclosed in a casing 105. The user cannot remove the mobile touch screen device 150 from the casing 105. The purpose of the casing is to protect the components of the embodiment from external factors in a clinical setting. The casing is comprised of a top cover 110 and a back cover 120.

The top cover 110 exposes the mobile touch screen device 150 fully so that all touch controls are accessible to a user. In this embodiment, the mobile touch screen device is the iPod Touch 4. The top cover 110 exposes the touch screen, including the home button 113. The Wi-Fi antenna (not pictured) integrated into the iPod Touch 4, is accessible to area networks.

A bar code scan engine 160, is positioned in back of the mobile touch screen device 150 in this embodiment to establish a 15 degree scanning angle, an efficient angle for scanning bar codes and other images of decodable indicia. The embodiment has a curved back 155. The curved back 155 is ergonomically designed to make the device easy to grasp, while using the scanning and data entry functionalities. The battery 180, which is additional to any battery in the mobile touch screen device 150, extends the battery life of the device; nurses and others in medical settings work longs shifts and cannot stop to charge the device.

In the rear view 100c, the scan decode board 115, which is positioned under the scan engine 160 is visible. When an image of decodable indicia, such as a bar code, is scanned using the scan engine 160, the scan decode board 115 locates the decodable indicia within the image and decodes it. The resultant decoded data is received by the mobile touch screen device 150 via the second interface board 135, which is controlled by the first interface board 125. (The terms "first" and "second" are used for clarity and are not meant to assign any order or importance to either component.)

In this embodiment, the first interface board 125 and the second interface board 135 are printed circuit boards (PCB boards), and mechanically support and electrically connect the electronic components using conductive pathways, tracks or signal traces etched from copper sheets laminated onto a non-conductive substrate.

The first interface board 125 has connectors for the microcontroller (MCU) (not pictured), battery charger (not pictured), and the MCU power management circuit (not pictured). The second interface board 1035 interface board has connectors for the mobile touch screen device 150 and the USB (not pictured).

Figure 10:
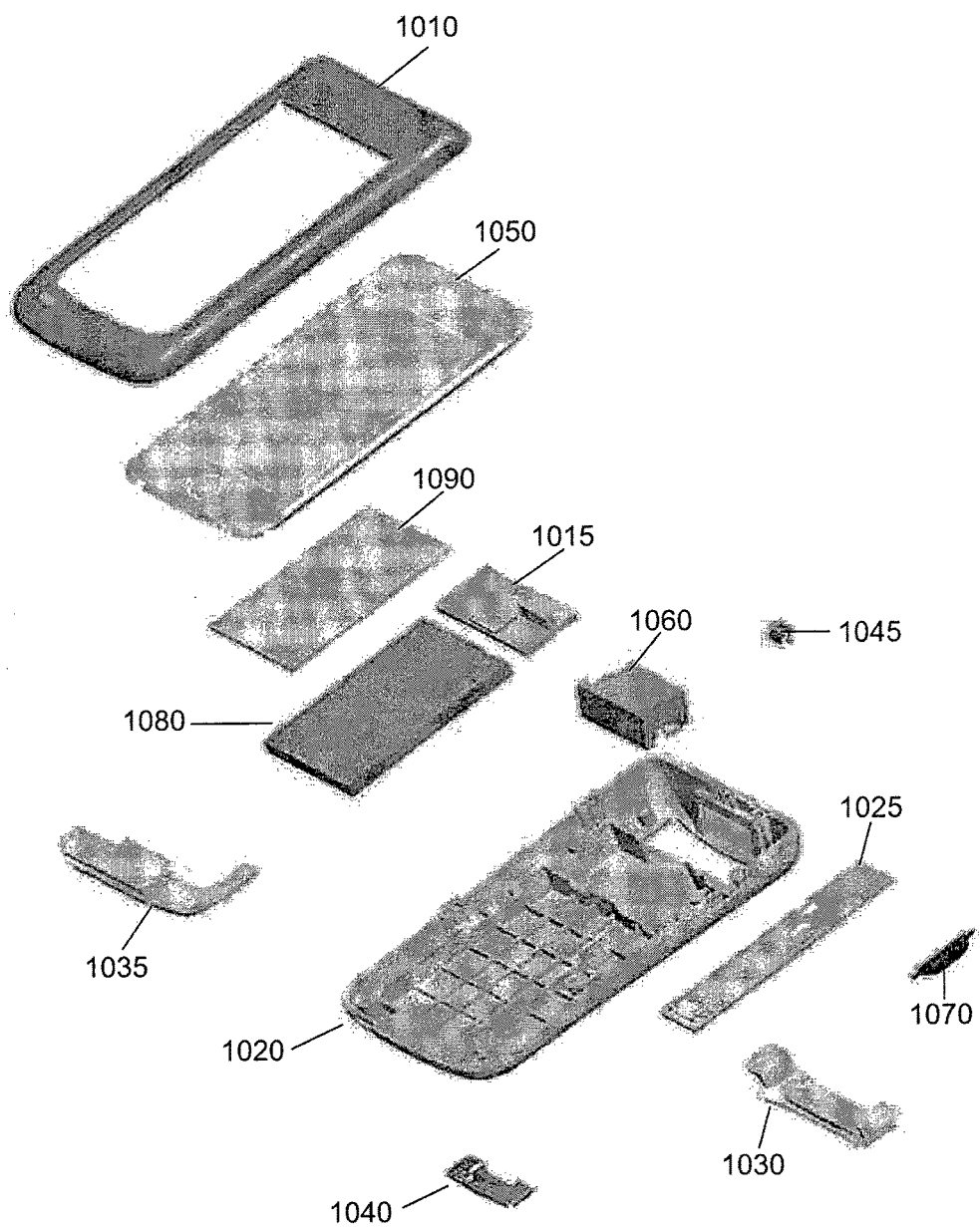
FIG. 10 depicts an exploded view of embodiment of the present invention.

The functionality of the first interface board 125 and the second interface board 135 is described more completely in reference to FIG. 10. However, both boards assist in transferring the bar code data from the decode board 115 to the touch screen device 150 and the resultant commands, if any, from the touch screen device 150 to the decode board 115. The first interface board 125, which houses the MCU (not pictured), transfers the bar code data from the decode board 115 to the MCU and any commands from the MCU (not pictured) to the decode board 115. The second interface board 135 transfers bar code data from the MCU (not pictured) to the mobile touch screen device 150 and commends from the mobile touch screen device 150 to the MCU (not pictured). This MCU resides on the first interface board 125 and controls all the functionality of the first interface board 125 and the second interface board 135, including the operations of the second interface board 135 when it transfers bar code data from the decoder board 115 to the mobile touch screen device 150.

The internal Wi-Fi antenna (not pictured) in the mobile touch screen device 150 can transmit the decoded data to an external resource, such as a server, within the network and/or a shared resource, such as a resource of a cloud.

The functionality of the apparatus, from a user perspective, is increased because the apparatus can off-load both data and processing operations to external resources. In mobile computing, and specifically in a clinical environment, the lighter the device, the better. However, the size of a mobile device is determined by the processing that the device is to accomplish when in use. If more storage and more processing power are required for certain operations, the required memory and processor to accomplish these tasks could render the device larger than the ideal size for maximum mobility. By off-loading storage and processing, neither the size nor the functionality of the a device is compromised.

When the mobile touch screen device 150 connects to cloud computing resources over a communications network, the perceived processing power and storage capacity of this embodiment will appear limitless to the user.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. It is understood by one of ordinary skill in the art that any external data processing and storage system with these characteristics would also be included in this disclosure.

One characteristic of the cloud computing model is that a consumer can unilaterally provision computing capabilities, such as CPU power and storage capacity on the network, as needed automatically without requiring human interaction with the service's provider. The resources of the cloud are available over a network and can be utilized by consumers using a custom thin client, a software application that uses the client-server model where the server performs all the processing, or a standard web browser, running on a user terminal, including but not limited to smart phones, touch-pad computers, such as the iPad, iPod Touch, tablet computers, desktop, and mobile computers, such as laptops.

The cloud computing model allows services to be delivered through shared data centers that can appear as a single point of entry, or a communications gateway, for a terminal accessing the cloud. For example, a user accessing an application as a service or a platform as a service may use a web browser to connect to a URL. At that URL, the user gains access to the cloud. While accessing the cloud through the web browser, the user will not be aware of the computers or networks that are serving the application and/or platform that the user is accessing. It could be a single computer or an elaborate network. This is not important to the user, as the owner of the cloud works to provide the user with the cloud services seamlessly.

Referring to FIG. 1, the user can enter data through the touch screen interface 112 on the mobile touch screen device 150. The internal processor in the mobile touch screen device 150 executes computer code opening a connection to a cloud resource for storage or further processing of the data.

In this embodiment, when the user initiates the scanning functionality, the scan engine 160, captures the image of decodable indicia. The decodable indicia is located and decoded by the scan decode board 115 and the data is sent by the second interface board 135, as controlled by the first interface board 125 to the mobile touch screen device 150. The internal processor (not pictured) in the mobile touch screen device 150 executes computer code that processes this data. The image of decodable indicia can be transmitted in formats including, but not limited to, a raw image bitstream or a compressed byte bitstream. A compressed image bitstream includes but is not limited to a TIFF byte stream, a GIF byte stream, a JPEG byte stream, or MPEG byte stream.

In this embodiment, the processor that executes the computer code is internal to the mobile touch screen device 150. However, via the wireless capabilities of the mobile touch screen device 150, in additional embodiments of the present invention, the computer code that renders the GUI on the touch screen user interface 112 of the mobile touch screen device 150, is either partially or entirely executed on a remote processor and communicates through a wireless network connection with the processor on the mobile touch screen device 150, utilizing a client-server technical architecture. In additional embodiments of the present invention, where the computer code is executed on the internal processor of the mobile touch screen device 150, the computer code resides on storage resources including, but not limited to, resources external to the mobile touch screen device 150, proprietary network resources, and/or shared network resources, such as resources of the aforementioned cloud computing system.

Figure 2:
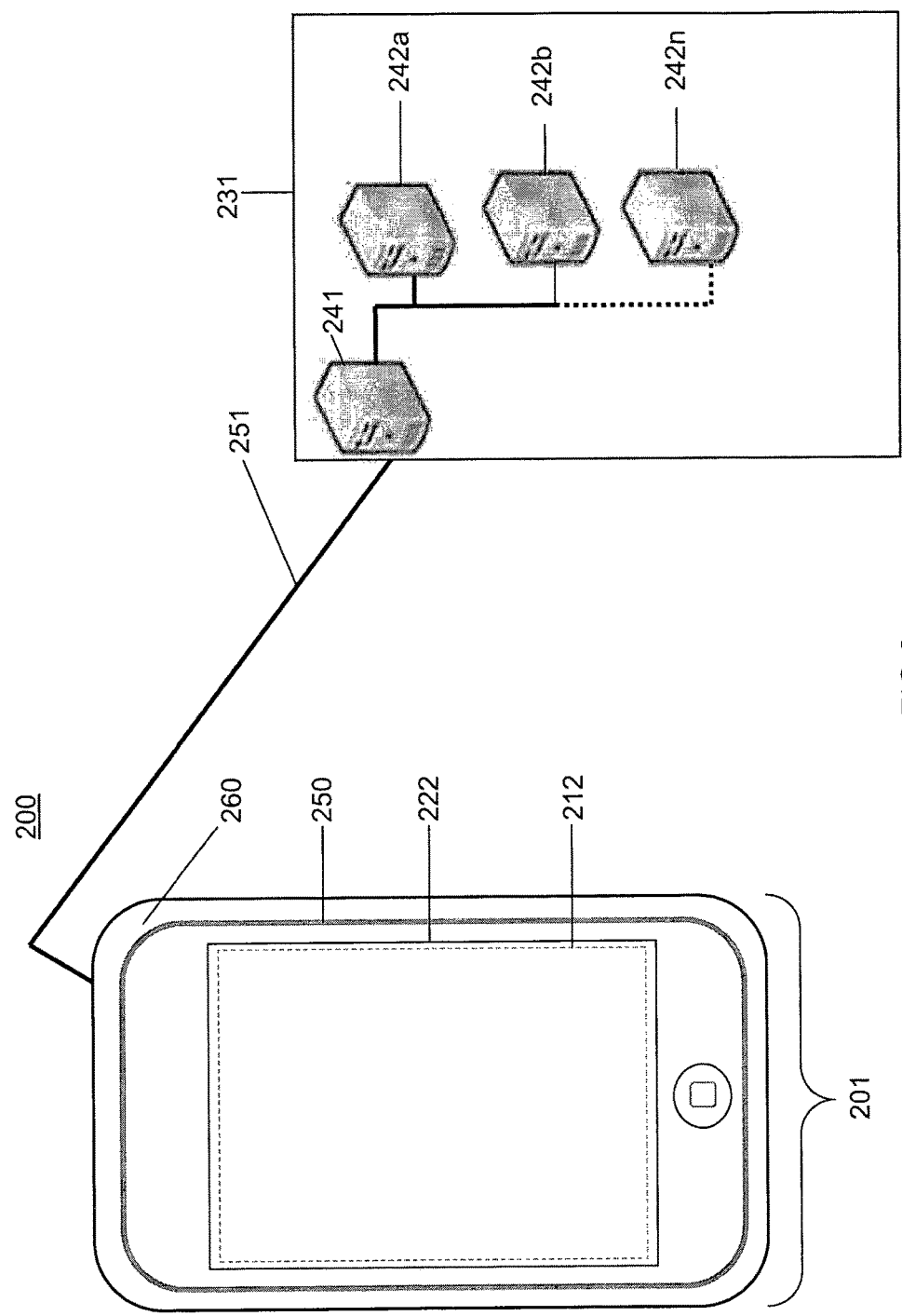
FIG. 2 depicts a technical architecture utilizing an embodiment of the present invention.

FIG. 2 is an example of a technical architecture 200 that demonstrates how an embodiment of the apparatus 201 of the present invention is used in conjunction with a data storage and processing system, such as a cloud. Referring to FIG. 2, the technical architecture 200 of a system utilizing an embodiment of the present invention includes the apparatus 201 of FIG. 1, which includes a mobile touch screen device 250, running a thin client 222 on its touch screen interface 212. One example of the thin client 222 is a web browser, which serves as the graphical user interface (GUI), also called the front end. The apparatus 201 includes a scan engine 260, used to scan decodable indicia. The mobile touch screen device 250 connects to a data processing and storage system 231, such as a cloud, over a network 251.

The data processing and storage system 231 in this embodiment includes but is not limited to, a server-side proxy component 241 at least two back-end computers 242a, 242b, 242n, which contain the computing and storage resources of the data processing and storage system 231. In FIG. 2, the resources of the data processing and storage system 231 are located in the same physical facility. However, in additional embodiments of the present invention, the resources of the data processing and storage system 231 are spread out over at least two different physical locations.

The network 251 connecting the mobile touch screen device 250 to the data processing and storage system 231 includes, but is not limited to, a public network, a virtual private network (VPN), a local area network (LAN), a wide area network (WAN), wireless LAN, wireless WAN, wireless PAN and/or the Internet.

Installed on the application server resources of the data processing and storage system 231, is the back end software that performs operations that require processing utilizing processor resources in the data processing and storage system. Data processed when the software is executed on the processor(s) are saved in the storage resources of the data processing and storage system and/or can be further utilized by the application server resources of the data processing and storage system 231 to interact with servers internal and external to the data processing and storage system 231 (not pictured). For example, a server running a billing system may be internal or external to the data processing and storage system 231. As a result of the data processing in the data processing and storage system 231, data may be returned to the mobile touch screen device 250 and can render in the thin client 222.

Figure 3:
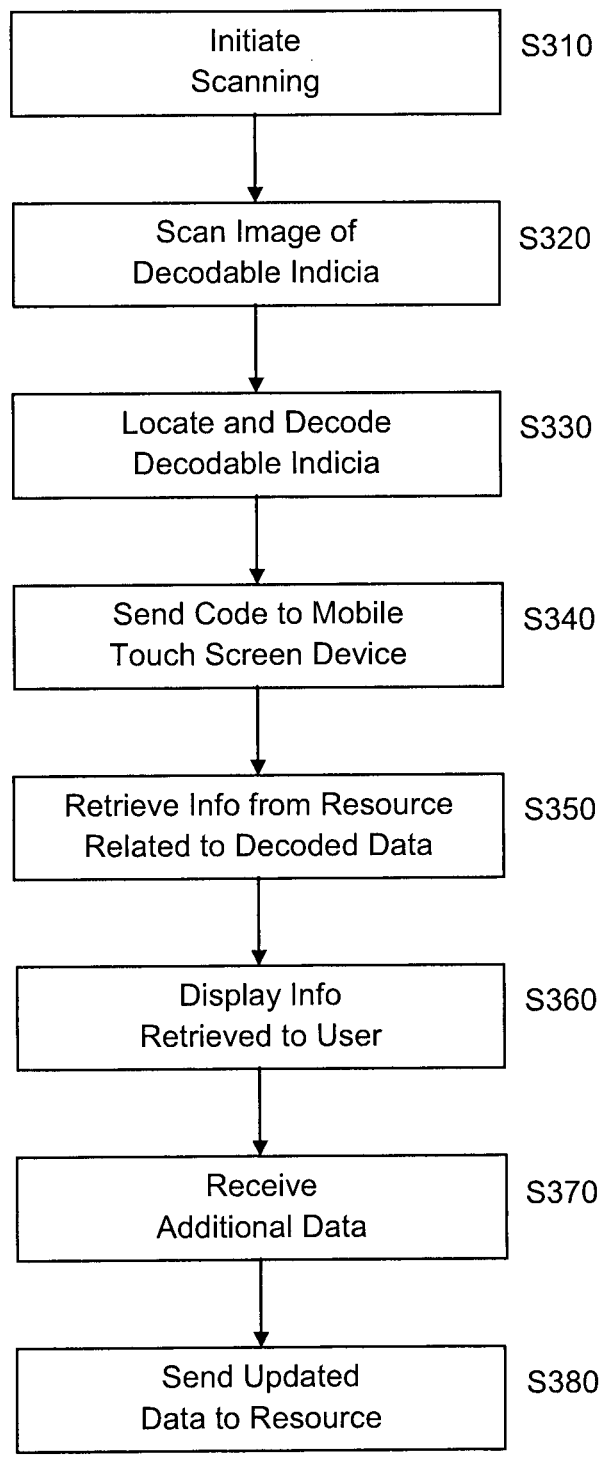
FIG. 3 depicts a workflow of an embodiment of the present invention.

FIG. 3 is a workflow of an embodiment of the present invention. The workflow can be understood by referencing FIG. 2.

First, the user of the apparatus 201 initiates a scanning operation (S310). In response, the scan engine 260 of the device scans a bar code, an image of decodable indicia (S320). The image of decodable indicia is located and decoded with the assistance of the scan decode board 215 (S330). The decoded data is sent to the processor of the mobile touch screen device 250 (S340). Computer code executed on the processor of the mobile touch screen device 250 communicates with a storage resource, including but not limited to, an internal storage device, a network storage device, or a shared storage resource, such as a cloud resource, to retrieve information coordinating with the decoded data (S350). In an embodiment of the invention, this step entails the mobile touch screen device 250 connecting to a data processing and storage system 231, such as a cloud, over a network 251.

The mobile touch screen device 250 displays the retrieved data to the user (S360). The mobile touch screen device 250 receives additional data entered by the user (S370). The mobile touch screen device 250 sends the updated data to the storage resource from which the data was retrieved (S380).

Figure 4:
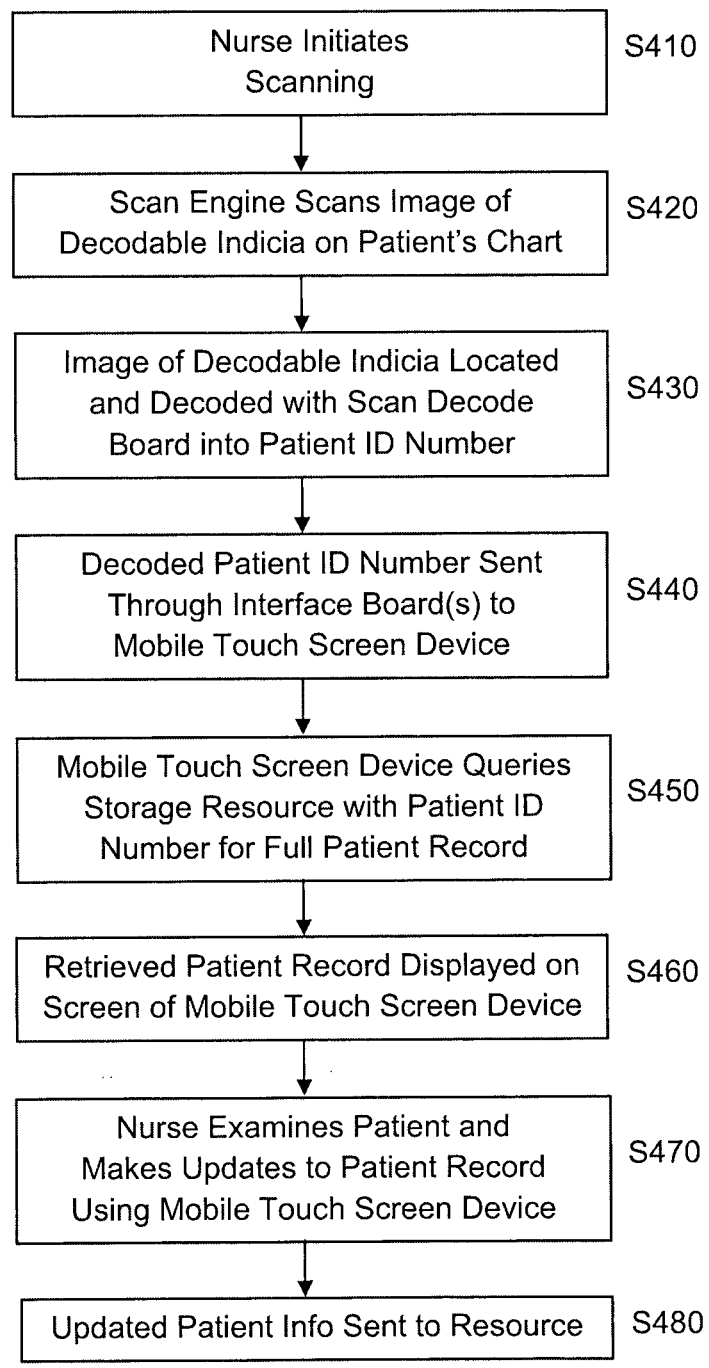
FIG. 4 depicts an example of a workflow of an embodiment of the present invention.

The workflow of FIG. 3 can be used specifically to update the medical record of a patient. FIG. 4 is a workflow of this example. First, a nurse using the device initiates the scanning functionality (S410) and the scanning engine 260 scans the bar code on a patient's chart (S420). The bar code is an encoded identification number for the patient. The image of decodable indicia is located and decoded with the assistance of the scan decode board 215 (S430). The decoded data is sent, with the assistance of the first interface board 225 and the second interface board 235, to the mobile touch screen device 250 (S440). After the bar code is decoded, the mobile touch screen device 250 queries the storage resource to return information regarding the patient based on the identification number (S450). The retrieved patient information is displayed on the user interface 212 of the mobile touch screen device 250 (S460). As the nurse examines the patient, he or she updates the displayed medical record using the touch screen functionality (S470). These updates are conveyed to the storage device and saved in the medical record (S480).

The information retrieved and/or updated on the mobile touch screen device, includes but is not limited to patient information and/or information regarding the nurse or doctor to which a patient is assigned. In an embodiment of the present invention, via the wireless connection point in the mobile touch screen device 250, any patient, doctor, and/or nurse information can be retrieved, entered, and/or updated on a remote resource, such as a dedicated or shared web server, and/or a cloud resource.

Figure 5:
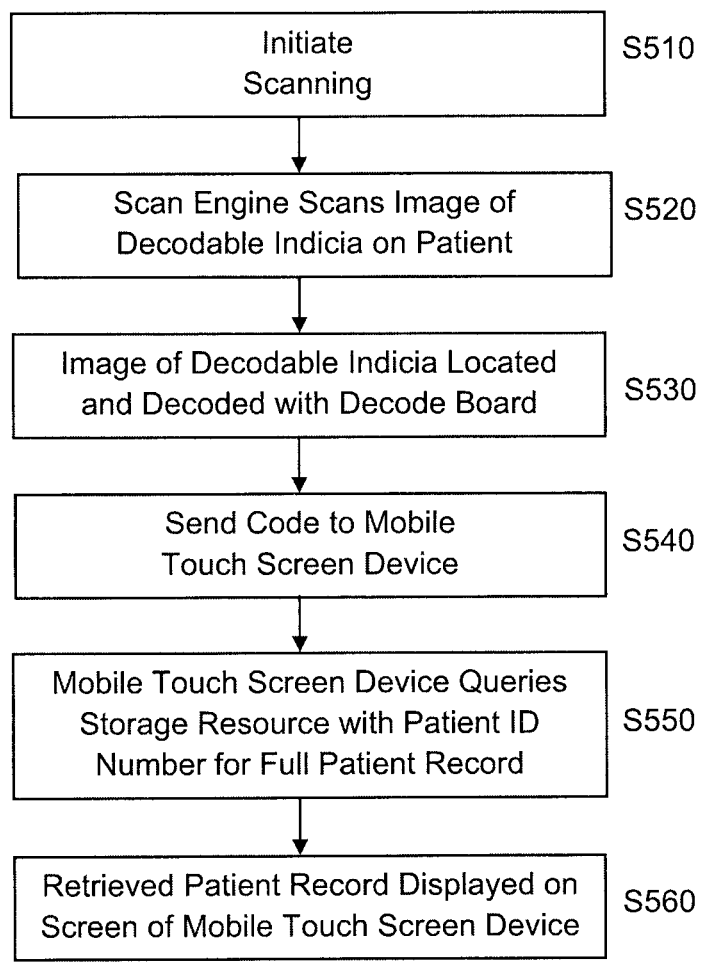
FIG. 5 depicts an example of a workflow of an embodiment of the present invention.
Figure 6:
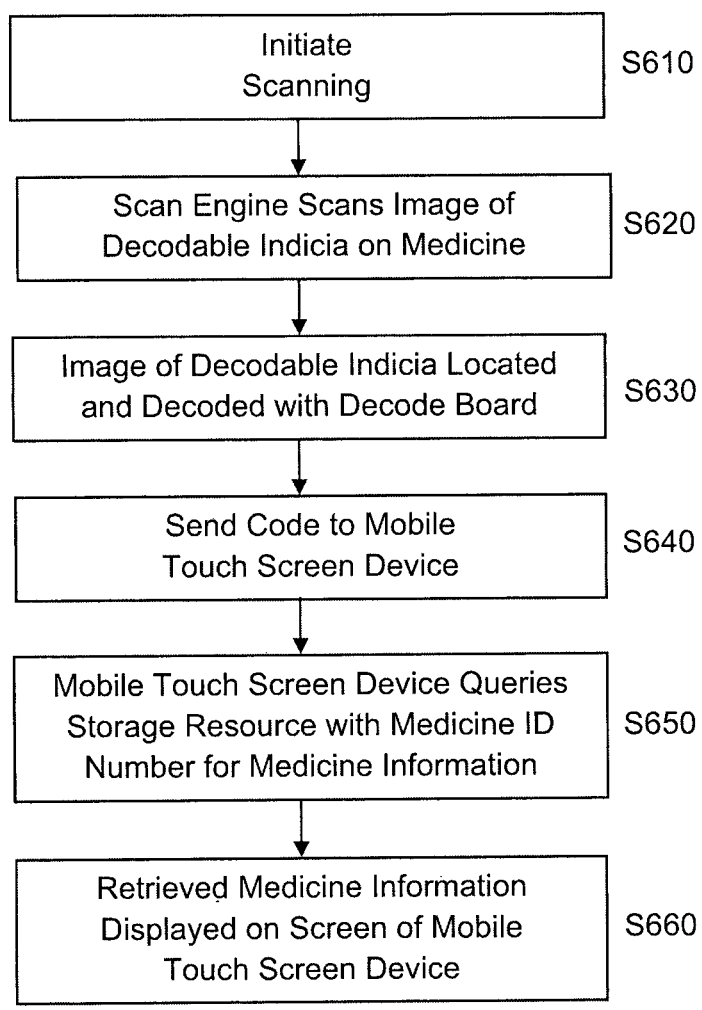
FIG. 6 depicts an example of a workflow of an embodiment of the present invention.
Figure 7:
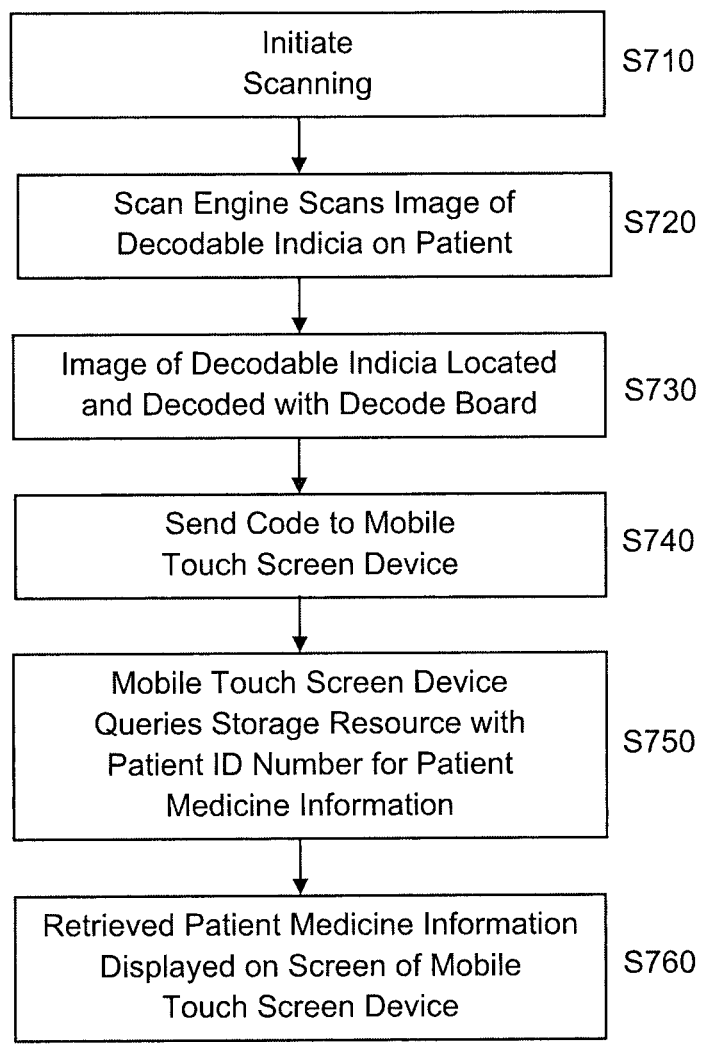
FIG. 7 depicts an example of a workflow of an embodiment of the present invention.

FIGS. 5-7 demonstrate additional workflows for embodiments of the present invention. FIG. 5 is a workflow is which an embodiment of the apparatus of the present invention 201, for example, is used to retrieve the identity of a patient upon scanning a bar code affixed to the patient. FIG. 6 is a workflow is which an embodiment of the apparatus of the present invention 201, for example, is used to retrieve information about a particular medicine by scanning a bar code affixed to the medicine. FIG. 7 is a workflow is which an embodiment of the apparatus of the present invention 201, for example, is used to match a patient with his or her medication, by scanning a bar code affixed to the patient.

Referring the FIG. 5, a nurse or medical worker using the device initiates the scanning functionality (S510) and the scanning engine 260 scans the bar code on a patient (S520). The bar code is an encoded identification number for the patient. The image of decodable indicia is located and decoded with the assistance of the scan decode board 215 (S530). The decoded data is sent, referred to in FIG. 5 as the code, with the assistance of the first interface board 225 and the second interface board 235, to the mobile touch screen device 250 (S540). After the bar code is decoded, the mobile touch screen device 250 queries the storage resource to return the patient's full record based on the identification number (S550). The retrieved patient information is displayed on the user interface 212 of the mobile touch screen device 250 (S560).

Referring the FIG. 6, a nurse or medical worker using the device initiates the scanning functionality (S610) and the scanning engine 260 scans the bar code on a medication (S620). The bar code is an encoded identification number for the medication. The image of decodable indicia is located and decoded with the assistance of the scan decode board 215 (S630). The decoded data is sent, referred to in FIG. 6 as the code, with the assistance of the first interface board 225 and the second interface board 235, to the mobile touch screen device 250 (S640). After the bar code is decoded, the mobile touch screen device 250 queries the storage resource to return information regarding the medication based on the decoded code that appeared on the physical medication (S650). The retrieved medication information is displayed on the user interface 212 of the mobile touch screen device 250 (S660).

Referring the FIG. 7, a nurse or medical worker using the device initiates the scanning functionality (S710) and the scanning engine 260 scans the bar code on a patient (S720). The bar code is an encoded identification number for the patient. The image of decodable indicia is located and decoded with the assistance of the scan decode board 215 (S730). The decoded data is sent, referred to in FIG. 7 as the code, with the assistance of the first interface board 225 and the second interface board 235, to the mobile touch screen device 250 (S740). After the bar code is decoded, the mobile touch screen device 250 queries the storage resource to return the medication information for a patient, for example, a list of the medications that have been prescribed to the patient, based on the identification number (S750). The retrieved medication information is displayed on the user interface 212 of the mobile touch screen device 250 (S760). Conversely, an embodiment of the present invention can be utilized to locate patient information based upon scanning a bar code on medication. For example, once a bar code that appears on medication is scanned and decoded, it can be used to retrieve a list of patients who have been prescribed that medication.

Figure 8:
FIG. 8 is an exemplary screenshot used in an embodiment of the present invention.

FIG. 8 is an exemplary screenshot used in an embodiment of the present invention. This screenshot depicts the GUI on the mobile touch screen device 250 displaying the medical data of a patient, retrieved from the database based on the decoded identification number. Referring to FIG. 8, the nurse can update the patient's condition using this screen. In an embodiment of the present invention, the updates made are sent via the wireless antenna of the mobile touch screen device 250 to a data processing and storage system 231, such as a cloud.

Figure 9:
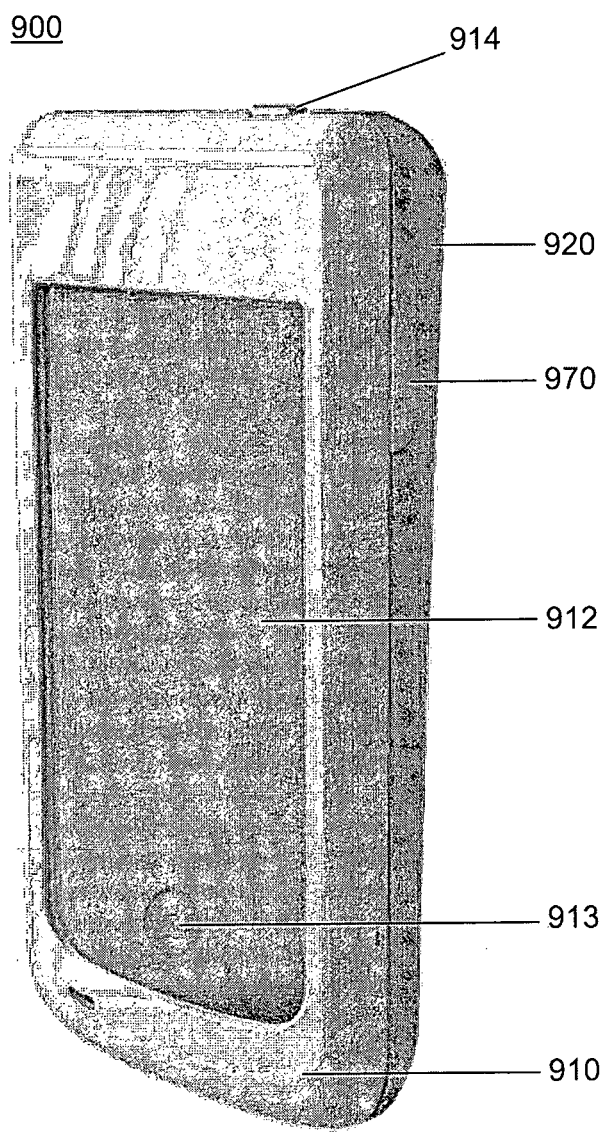
FIG. 9 depicts an embodiment of the present invention.

The user of the apparatus initiates the scanning. Referring to FIG. 9, this embodiment 900 offers two options to a user for initiating the scanning operations. First, a user can activate the scanning engine using the graphical user interface (GUI) on the mobile touch screen 912. Second, the user can depress the scan button 970, which is accessible in a break in the back cover 920.

The scan button 970 is an externally accessible feature, thus, in a clinical or hospital environment, it is advantageous to construct the power button from a material that is resistant to cleaners, such as alcohol/disinfectant wipes. Materials used to create the scan button 970 in this embodiment, include but are not limited to a combination of ABS, a rigid polymer that will not rupture or absorb product when cleaned, and rubber, for flexibility of use.

Referring to FIG. 9, in this embodiment 900, the standby button 914 in the mobile touch screen device 950 is accessible through the top cover 910. The battery life of web-enabled portable computing devices, such as the iPod Touch, is sometimes limited because manufacturers of these mobile devices must weigh making the devices as light as possible against integrating a larger, and therefore longer life, battery. Exposing the standby button 914 of the mobile touch screen device 950 increases the useable battery life of the embodiment.

FIG. 10 is an exploded view of an embodiment of the apparatus 1000 and displays the components of this embodiment. Referring to FIG. 10, the casing is comprised of a top cover 1010 and a back cover 1020. The top cover 1010 and the back cover 1020 encase the components in the device, including the mobile touch screen device 1050, and the scan engine 1060. In this embodiment, the casing is not removable by the user. The surface of the casing is optionally resistant to exposure to alcohol/disinfectant wipes. This feature allows the surface to be disinfected in the unhygienic clinical environment.

In an embodiment of the present invention, the material comprising the casing includes, but is not limited to, a combination of acrylonitrile butadiene styrene (ABS) and polycarbonate (PC). As both ABS and PC are rigid polymers, they would continue to protect the components inside the device when exposed to the rigorous cleaning procedures in a hospital or clinical environment.

Of the components in apparatus 1000, there are components that enable the scanning operations, components that enable communications, including both those with the use of the apparatus 1000 and additional network resources, and parts that allow these two diverse functions to work together. The components that participate in the scanning operations of the device 1000, include, but are not limited to, the scan engine 1060, the battery 1080, the scan decode board 1015, and the first interface board 1025, and the second interface board 1035.

The battery 1080 is additional to the an internal battery (not pictured) in the mobile touch screen device 1050. The battery 1080 is used by components including but not limited to the decode board 1015 and the scan engine 1060. If the mobile touch screen device 1050 is the iPod Touch 4, the internal battery is a 3.3 v battery. The battery 1050 is a 5 v battery in some embodiments of the present invention. Using the combination of the internal battery and the battery 1080, the battery life of the apparatus 1000 can be more than twelve (12) hours on a full charge. The type of battery 1080 includes but is not limited to a dedicated rechargeable lithium-ion battery.

The scan engine 1060 scans bar codes and other images of decodable indicia. The scan decode board 1015 locates the decodable indicia and decodes the scanned images. Image formats for decodable indicia that can be scanned by the scan engine 1060 and decoded by the decode board 1015, include but are not limited to: 1D bar codes, 2D bar codes, portable document format (PDF), postal symbols, and OCR symbols.

As aforementioned the first interface board 1025 and the second interface board 1035 are PCBs. Generally, the first interface board 1025 houses the MCU and battery charger and the MCU power management circuit. Meanwhile, the second interface board 1035 has connectors for the mobile touch screen device 1050 and the USB.

The functionality of the first interface board 1025 includes but is not limited to: 1) a battery charger and MCU power management circuit for the battery 1080; 2) an MCU that controls all the functionality of the first interface board 1025 and the second interface board 1035, including the operations of the second interface board 1035 when it transfers bar code data from the decoder board 1015 to the mobile touch screen device 1050 and transfers commands from the mobile touch screen device 150 to the decode board 1015; 3) a switch circuit for the scan button 1070; 4) a connector for the decode board 1015, which transfers bar code data from the decode board 1015 to the MCU and commands from the MCU to the decode board 1015; 5) a board to board connector.

The functionality of the second interface board 1035 includes but is not limited to: 1) a USB connector used for communications and to charge the battery 1080 and the battery internal to the mobile touchy screen device 1050, embodiments of the invention are configured to accept standard USB and mini/micro USB cables; 2) a connector to the mobile touch screen device 1050 that transfers bar code data from the MCU to the mobile touch screen device 1050 and transfers commands from the mobile touch screen device 1050 to the MCU, transfers USB communications from the USB connector; 3) an input power current inrush limiter circuit; 4) a backup charger circuit which allows the battery 1080 charged the internal mobile touch screen device battery; and 5) a board to board connector.

The first interface board 1025 and the second interface board 1035 facilitate the communication between the decode board 1015 and the mobile touch screen device 1050. This mobile touch screen device 1050 is largely responsible for the communications functions of the apparatus 1000. The touch screen interface 1012 displays data to the user and accepts entry of data from the user and the Wi-Fi antenna connects to a communications network.

The scanning of a bar code, an image of decodable indicia, is triggered within the device 1000 by user interaction with the graphical user interface (GUI) on the mobile touch screen device 1050, and/or the user pressing the scan button 1070. Once this scanning operation is triggered, the optical scanner in the scan engine 1060, captures the bar code, which is decoded with the assistance of the scan decode board 1015. The resultant data, which, in this embodiment, includes but is not limited to patient identification information, is transferred first from the decode board 1015 to the MCU on the first interface board 1025, and then from the MCU to the mobile touch screen device 1050, by the second interface board 1035, under the control of the first interface board 1025.

Computer program code executed on the internal processor of the mobile touch screen device 1050 processes the data and displays the data and/or coordinating data on the user interface. The image of decodable indicia can be transmitted in formats including, but not limited to, a raw image bitstream or a compressed byte bitstream. A compressed image bitstream includes but is not limited to a TIFF byte stream, a GIF byte stream, a JPEG byte stream, or MPEG byte stream.

The embodiment of FIG. 10 also includes a power button 1045. Switching the device 1000 off when not in use saves battery life and also assists in securing the device. As the power button 1045 is an externally accessible feature, in a clinical or hospital environment, it is advantageous to construct the power button from a material that is resistant to cleaners, such as alcohol/disinfectant wipes. Materials used to create the power button 1045 include but are not limited to a combination of ABS, a rigid polymer that will not rupture or absorb product when cleaned, and rubber, for flexibility of use.

To aid in the mobility of the device, a back cover belt rivet 1030 and a belt rivet 1040 are affixed to the back cover 1020. The belt rivet holds a belt in place that allows the device to be carried more easily. The back cover belt rivet is made of metal because in addition to contributing to the mobility of the device, it also dissipates the heat generated by some of the parts inside the apparatus 1000.

Figure 11:
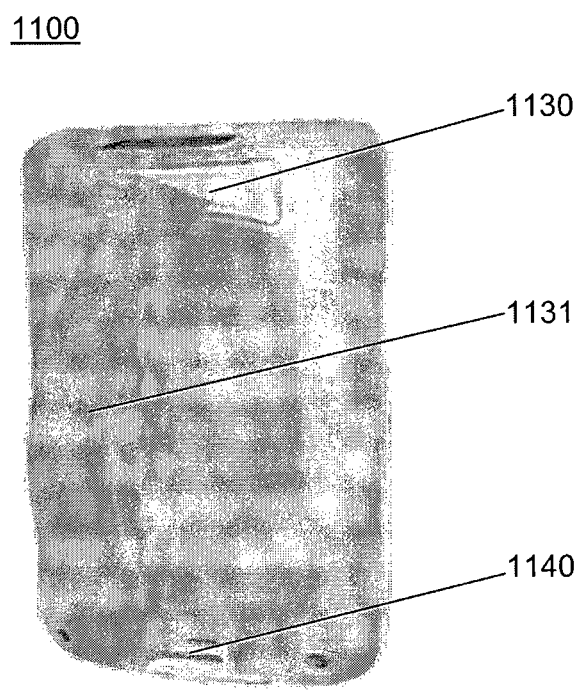
FIG. 11 depicts an embodiment of the present invention.
Figure 12:
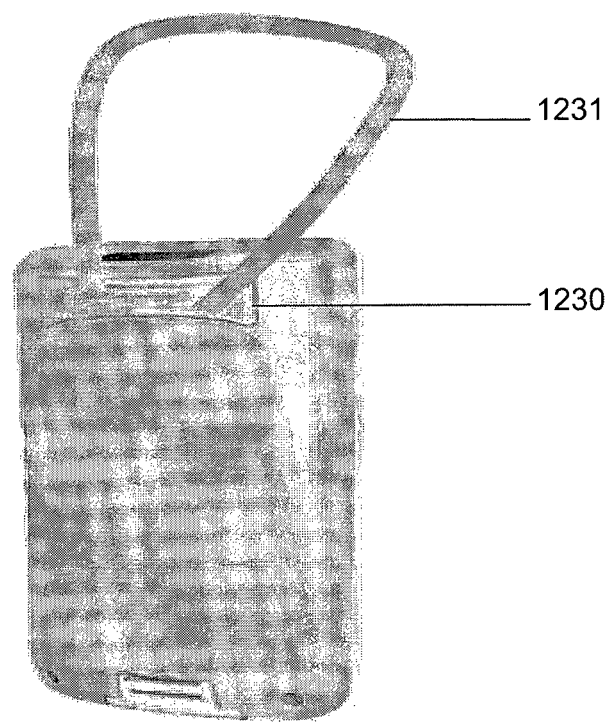
FIG. 12 depicts an embodiment of the present invention.

FIG. 11 and FIG. 12 demonstrate two methods of attaching a belt to the back cover 1120, 1220 of embodiments of the present invention.

Referring to the embodiment of FIG. 11 1100, a belt 1131, is affixed to both the back cover belt rivet 1130 and the belt rivet 1140. By attaching the belt to both places, the device can be worn on a user's arm or wrist. The curved back of the back 1155 cover fits the curve of the user's wrist.

In the embodiment 1200 of FIG. 12, a belt 1231, is attached to the back cover belt rivet 1230 only. The loop created by this attachment can be worn, for example, on the belt of a burse's pants, and/or can be worn on the wrist.

A hand-held mobile device is not comfortable to hold if it heats up during use. The batteries in mobile computers are among the exothermic parts in these computers that generate heat and limit the amount of time a user can stay in contact with the computer. Despite the name "laptop," some mobile computers become so hot that they are uncomfortable to hold on one's lap. Nurses and hospitals carry current mobile scanning devices regularly. Thus, the heat that radiates from these devices is regulated in order to allow the nurses to hold the devices comfortably. Referring back to FIG. 10, the apparatus 1000, has three exothermic parts: 1) the scanning engine 1060; 2) the mobile touch screen device 1050, which has an internal battery; and 3) the battery 1080.

The embodiment 1300 of FIG. 13 highlights the exothermic parts in an embodiment of the present invention. Referring to FIG. 13, the battery 1380, scan engine 1360 and mobile touch screen device 1350 all generate heat while operating. The back cover belt rivet 1330 is made of metal, including but not limited to an aluminum alloy, and therefore can dissipate this heat. Placing a heated device 1300 on one's wrist or just carrying a heated device is painful. Thus, the heat shield 1090, shown in FIG. 10, deflects the heat from the contact points, i.e., where the user touches the device when in use. The back cover belt rivet 1330 helps to dissipate this heat.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

The invention claimed is:
1. A data entry and scanning apparatus comprising:
a casing;
a commercially available mobile device comprising a touch screen display, a processor, and a wireless communications network access point;
a scanning device connected to said commercially available mobile device via an interface;

wherein both the commercially available mobile device and the scanning device are enclosed together within said casing, said casing not covering the touch screen display;

a power source external to said commercially available mobile device, the power source enclosed within said casing and coupled to said interface;

wherein said scanning device is configured to scan an image of decodable indicia in response to receiving a command from said interface, wherein said interface is configured to send said command to said scanning device in response to receiving input on said touch screen, wherein said scanning device is further configured, in response to scanning said image of decodable indicia, to locate said decodable indicia within said image of decodable indicia, wherein said scanning device is further configured, in response to locating said decodable indicia, to decode said decodable indicia into a decoded message, wherein said interface is configured to transmit said decoded message from said scanning device to said processor of said commercially available mobile device and wherein the decoded message is displayed on the touch screen display.

2. The data entry and scanning apparatus of claim 1, wherein said casing positions said optical scanner at a 15 degree angle relative to said image of decodable indicia when said apparatus is positioned parallel to said image of decodable indicia.

3. The data entry and scanning apparatus of claim 1, wherein said power source is a battery.

4. The data entry and scanning apparatus of claim 1, further comprising a heat shield between said power source and said casing.

5. The data entry and scanning apparatus of claim 1, said casing comprised of acrylonitrile butadiene styrene and polycarbonate.

6. The data entry and scanning apparatus of claim 1, wherein said casing comprises a first portion and a second portion,
wherein said first portion and said second portion mate,
wherein said first portion touches said commercially available mobile device,
wherein said second portion touches said scanning device, and wherein said second portion is concave.

7. The data entry and scanning apparatus of claim 1, wherein said wireless communications network access point is configured to send and receive data to and from a data storage and processing system.

8. The data entry and scanning apparatus of claim 1, further comprising:
a scan button located at a position external to said commercially available mobile device and coupled to said interface,
wherein a top portion of said scan button is not covered by said casing, and
wherein said interface is additionally configured to send said command to said scanning device when said scan button is depressed.

9. The data entry and scanning apparatus of claim 1, further comprising: a belt rivet affixed to said casing comprised of a material to dissipate heat.

10. The data entry and scanning apparatus of claim 1, wherein said scanning device comprises an optical scanner and a decode board, wherein said optical scanner is configured to capture said image of decodable indicia and to transmit said image of decodable indicia to said decide board, and wherein said decode board is configured to locate said decodable indicia within said image of decodable indicia and to decode said decodable indicia into said decoded message.

11. The data entry and scanning apparatus of claim 10, wherein said interface comprises a first interface board and a second interface board,
wherein said first interface board contains a microcontroller (MCU) and is coupled to said power source,
wherein said second interface board is coupled to said commercially available mobile device and a universal serial bus (USB),
wherein said first interface board is configured to transmit said decoded message from said decode board to said commercially available mobile device,
wherein said first interface board is further configured to transmit said command from said commercially available mobile device to said decode board,
wherein said second interface board is configured to transmit said decoded message from said decode board to said MCU, and
wherein said MCU controls said first interface board and said second interface board.

12. The data entry and scanning apparatus of claim 11, wherein said first interface board is a PCB board and said second interface board is a PCB board.

13. A method for combining a commercially available mobile device and a scanning device into a data entry and scanning apparatus, the method comprising:
coupling a first interface board to a power source external to said commercial available mobile device;
coupling a second interface board to said commercially available mobile device comprising a touch screen display and a wireless communications network access point;
coupling said scanning device to said commercially available mobile device via said first interface board wherein said scanning device comprises an optical scanner and a decode board and said first interface board is connected to said decode board;
enclosing said power source, said scanning device, said first interface board, said second interface board, and said commercially available mobile device, in a casing exposing said touch screen, and wherein said optical scanner is held at a fixed position within said casing that is not perpendicular to said commercially available mobile device, so as to form the data entry and scanning device such that the data entry and scanning apparatus captures an image of decodable indicia using the optical scanner in response to touching of the touch screen, locates decodable indicia within the image of decodable indicia, decodes the image of decodable indicia into a decoded message, and through the first interface board transmits the decoded message from the scanning device to the touch screen display.

14. The method of claim 13, further comprising:
coupling said second interface board to a USB.

15. The method of claim 13, wherein said first interface board and said second interface board are PCB boards.

16. The method of claim 13, wherein said power source is a battery.

17. The method of claim 13, further comprising:
affixing a belt rivet to said casing.

18. A method for using a commercially available mobile device and a scanning device as a data entry and scanning apparatus, the method comprising:
- coupling a first interface board to a power source external to said commercial available mobile device;
- coupling a second interface board to said commercially available mobile device comprising a touch screen display and a wireless communications network access point;
- coupling said scanning device to said commercially available mobile device via said first interface board wherein said scanning device comprises an optical scanner and a decode board and said first interface board is connected to said decode board;
- enclosing said power source, said first interface board, said second interface board, said scanning device, and said commercially available mobile device, in a casing exposing said touch screen, and wherein said optical scanner is held at a fixed position within said casing that is not perpendicular to said commercially available mobile device;
- initializing said scanning device in response to touching said touch screen;
- utilizing said optical scanner to capture an image of decodable indicia;
- utilizing said decode board to decode said image of decodable indicia wherein said decode board locates decodable indicia within said image of decodable indicia, and wherein said decode board decodes said decodable indicia into a decoded message;
- and
- viewing said decodable message on said touch screen display.

19. The method of claim 18, further comprising:

utilizing said wireless communications network access point to access a computer resource.

20. The method of claim 19, wherein said computer resource is a data processing and storage system.

* * * * *